(12) United States Patent
He et al.

(10) Patent No.: US 12,324,503 B2
(45) Date of Patent: Jun. 10, 2025

(54) LANYARD DEVICE

(71) Applicant: Shenzhen Lemore Marketing Consultancy Co., Ltd, Shenzhen (CN)

(72) Inventors: Jiajia He, Shenzhen (CN); Haining Hou, Shenzhen (CN); Chenglan Huang, Shenzhen (CN)

(73) Assignee: Shenzhen Lemore Marketing Consultancy Co., Ltd, Shenzhen (CN)

( * ) Notice: Subject to any disclaimer, the term of this patent is extended or adjusted under 35 U.S.C. 154(b) by 195 days.

(21) Appl. No.: 18/270,245

(22) PCT Filed: Jul. 21, 2021

(86) PCT No.: PCT/CN2021/107730
§ 371 (c)(1),
(2) Date: Jun. 29, 2023

(87) PCT Pub. No.: WO2022/142289
PCT Pub. Date: Jul. 7, 2022

(65) Prior Publication Data
US 2024/0057749 A1 Feb. 22, 2024

(30) Foreign Application Priority Data
Dec. 31, 2020 (CN) .......................... 202023349595.1

(51) Int. Cl.
*A45F 5/00* (2006.01)
*F16B 13/08* (2006.01)

(52) U.S. Cl.
CPC ................ *A45F 5/00* (2013.01); *F16B 13/08* (2013.01); *A45F 2005/006* (2013.01); *A45F 5/1516* (2025.01)

(58) Field of Classification Search
CPC .... A45F 2005/026; A45F 5/00; A45F 5/1516; A45F 2005/006; A45F 5/1508; A44B 99/005; Y10S 24/53
See application file for complete search history.

(56) References Cited

U.S. PATENT DOCUMENTS 3,514,820 A * 6/1970 Rogg ................... A44B 99/005
24/DIG. 58
5,604,958 A * 2/1997 Anscher ............... A45C 7/0086
24/165

(Continued)

*Primary Examiner* — Adam J Waggenspack
(74) *Attorney, Agent, or Firm* — IPRO, PLLC

(57) ABSTRACT

A lanyard device, comprising a main body portion, an elastic support, a colloid, a rotary pull head and a lanyard. The main body portion comprises a top wall and a side wall surrounding the top wall, the top wall and the side wall form an accommodating space in an enclosure manner, and a strip-shaped through hole is provided in the top wall; the elastic support is arranged in the accommodating space by means of corresponding to the strip-shaped through hole, the elastic support is provided with a crossed strip-shaped hole, the crossed strip-shaped hole comprises a first clamping strip-shaped hole and a second clamping strip-shaped hole crossed with the first clamping strip-shaped hole, and the first clamping strip-shaped hole is in communication with the strip-shaped through hole; the colloid at least seals part of the accommodating space and is used for adhering the lanyard device to an electronic apparatus; the rotary pull head comprises a pull head body, a pull head shaft and a clamping block, one side of the pull head body is connected to one end of the pull head shaft, a hook is arranged on the side of the pull head body away from the pull head shaft, and the other end of the pull head shaft is connected to the clamping block; and the lanyard is connected to the hook. The lanyard device is simple in terms of structure, convenient to be disassembled and convenient to store the lanyard, and is flexible to use in a matching manner.

10 Claims, 3 Drawing Sheets

(56) References Cited

U.S. PATENT DOCUMENTS

| | | | | |
|---|---|---|---|---|
| 6,032,339 | A | * | 3/2000 | D'Addario ......... A45C 13/1092 24/DIG. 54 |
| 6,305,588 | B1 | * | 10/2001 | Michel ..................... A45F 5/02 455/100 |
| 9,756,930 | B2 | * | 9/2017 | Hanchett ................... A45F 5/02 |
| 2006/0207072 | A1 | * | 9/2006 | Chen .................. A44B 11/2588 24/590.1 |

* cited by examiner

LANYARD DEVICE

TECHNICAL FIELD

The present application relates to the technical field of peripheral devices of electronic apparatuses, and in particular, relates to a lanyard device.

BACKGROUND

In many cases, a fixing device is required to fix an electronic apparatus such as a mobile phone in a certain part of the body, such as the wrist, arm or neck; for example, when squatting down to carry things or in other situations, it is inconvenient if the mobile phone is stored in clothes, trousers or bags; or for some people who are fond of going sightseeing, they need to frequently take out the mobile phone to take photos, and at this time, it is inconvenient if the mobile phone is stored in clothes, trousers or bags, and it is likely to miss some best shooting opportunities if the mobile phone is placed on clothes and trousers; in such situations, a lanyard is usually adopted in the prior art to fix the mobile phone shell and the mobile phone on the wrist, arm or neck through the lanyard; however, at present, the mobile phone shell is necessary for the arrangement of the lanyard and the lanyard cannot be directly provided on the mobile phone, and the mobile phone shell and the lanyard device are formed integrally and cannot be disassembled so that flexible matching cannot be achieved.

SUMMARY

The present application provides a lanyard device to solve the problem in the prior art that the mobile phone shell and the lanyard device are formed integrally so that flexible matching cannot be achieved.

In order to solve the above technical problem, a technical solution adopted by the present application is to provide a lanyard device, which comprises:

- a main body portion, comprising a top wall and a side wall surrounding the top wall, wherein the top wall and the side wall form an accommodating space in an enclosure manner, and a strip-shaped through hole is provided in the top wall;
- an elastic support, being arranged in the accommodating space by means of corresponding to the strip-shaped through hole, the elastic support being each provided with a crossed strip-shaped hole which comprises a first clamping strip-shaped hole and a second clamping strip-shaped hole crossed with the first clamping strip-shaped hole, the first clamping strip-shaped hole being in communication with the strip-shaped through hole;
- a colloid, at least enclosing part of the accommodating space and being used for adhering the lanyard device to an electronic apparatus;
- a rotary pull head, each comprising a pull head body, a pull head shaft and a clamping block, one side of the pull head body being connected to one end of the pull head shaft, a hook being arranged on the side of the pull head body away from the pull head shaft, and the other end of the pull head shaft being connected to the clamping block;
- a lanyard, being connected to the hook;
- wherein when the lanyard device is in a normal state, the clamping block of the rotary pull head is clamped into and fastened with the second clamping strip-shaped hole, and when the lanyard device needs to be disassembled, the rotary pull head is rotated so that the clamping block of the rotary pull head corresponds to the first clamping strip-shaped hole and the strip-shaped through hole.

Further, the lanyard device further comprises a rigid member, and the rigid member is arranged inside the colloid.

Further, a plurality of supporting columns are further convexly arranged inside the main body portion, and through holes are arranged at positions of the rigid member corresponding to the plurality of supporting columns.

Further, the supporting columns are welded by ultrasonic wave.

Further, the elastic support is further provided with avoidance holes, and the avoidance holes are arranged around the crossed strip-shaped hole.

Further, the avoidance holes are provided in four, and reinforcing ribs are arranged between adjacent ones of the avoidance holes.

Further, the clamping block is in the form of a racetrack.

Further, the first clamping strip-shaped hole and the second clamping strip-shaped hole intersect in a regular cross.

Further, the lanyard device further comprises a gasket, and the gasket is arranged between the top wall and the rotary pull head.

Further, the crossed strip-shaped hole, the strip-shaped through hole and the rotary pull head are respectively provided in two.

Beneficial effects of the present application are as follows: unlike the situation in the prior art, the lanyard device provided by the present application is provided with an elastic support, and a crossed strip-shaped hole is arranged on the elastic support, so that the rotary pull head can be conveniently installed and taken out by rotating to disassemble the lanyard, and the lanyard device of the present application can be directly adhered to the back of an electronic apparatus or the back of a protective shell of the electronic apparatus through the colloid; and thus, the lanyard device of the present application is simple in terms of structure, convenient to be disassembled and convenient to store the lanyard, and is flexible to use in a matching manner.

BRIEF DESCRIPTION OF THE DRAWINGS

In order to explain technical solutions in embodiments of the present application more clearly, attached drawings required in the description of the embodiments will be briefly introduced below; obviously, the attached drawings in the following description are only some embodiments of the present application, and for those of ordinary skill in the art, other drawings can be obtained according to these attached drawings without creative labor.

DETAILED DESCRIPTION

Hereinafter, technical solutions in embodiments of the present application will be described clearly and completely with reference to attached drawings in the embodiments of the present application; obviously, the embodiments described are only part but not all of the embodiments of the present application. Based on the embodiments of the present application, all other embodiments obtained by those of ordinary skill in the art without creative labor belong to the scope claimed in the present application.

It shall be noted that, if directional indicators (such as up, down, left, right, front, back and so on) are involved in the embodiments of the present application, then the directional indicators are only used to explain relative position relationships and movement situations among components in a specific posture (as shown in the attached drawing), and if the specific posture changes, the directional indicators will change accordingly.

In addition, if descriptions such as "first", "second" or the like are involved in the embodiments of the present application, then the descriptions such as "first", "second" or the like are only used for descriptive purposes, and should not be understood as indicating or implying the relative importance thereof or implicitly indicating the number of the indicated technical features. Therefore, features defined with "first" and "second" may explicitly or implicitly include at least one of the features. In addition, technical solutions among the embodiments may be combined with each other on the basis that they can be realized by those of ordinary skill in the art; and when the combination of the technical solutions is contradictory or impossible to be realized, it should be considered that such combination of the technical solutions does not exist, nor is it within the scope claimed in the present application.

Figure 1:
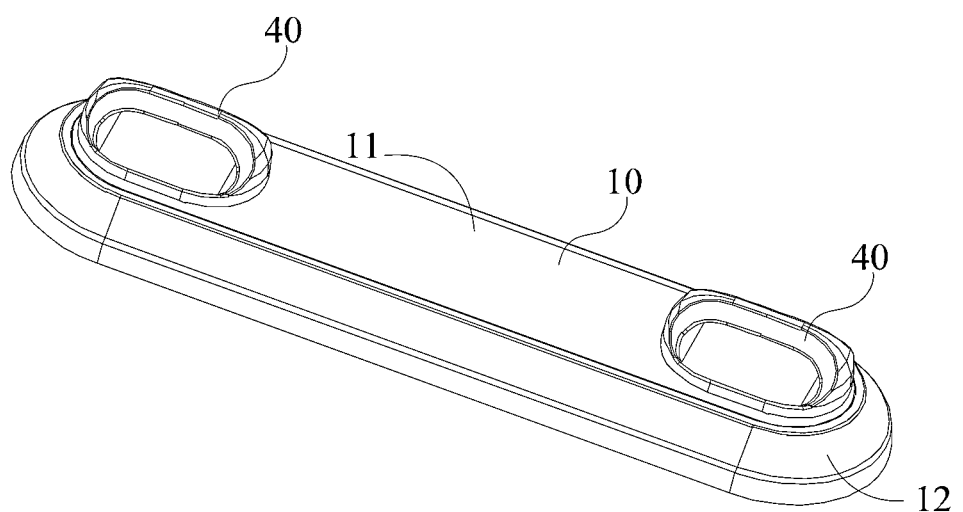
FIG. 1 is a schematic structural diagram of an embodiment of a lanyard device according to the present application.
Figure 2:
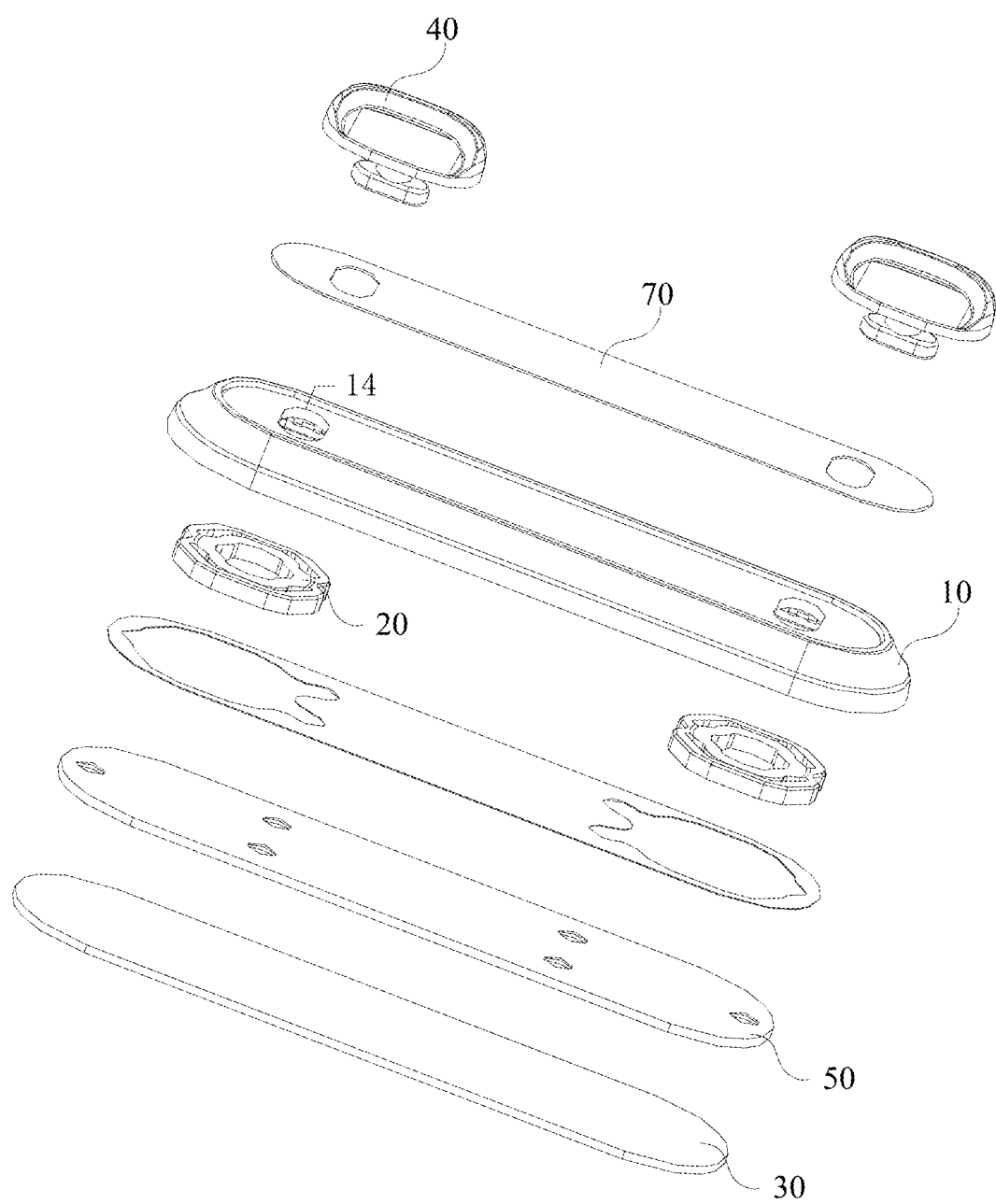
FIG. 2 is a schematic view of the exploded structure of the lanyard device shown in FIG. 1, in which a lanyard is omitted.

Please refer to FIG. 1 and FIG. 2 together, which are respectively a schematic structural diagram of an embodiment of a lanyard device of the present application, and a schematic view of the exploded structure of the lanyard device shown in FIG. 1, in which a lanyard is omitted. In this embodiment, the lanyard device comprises a main body portion 10, an elastic support 20, a colloid 30, a rotary pull head 40 and a lanyard (not shown).

Figure 3:
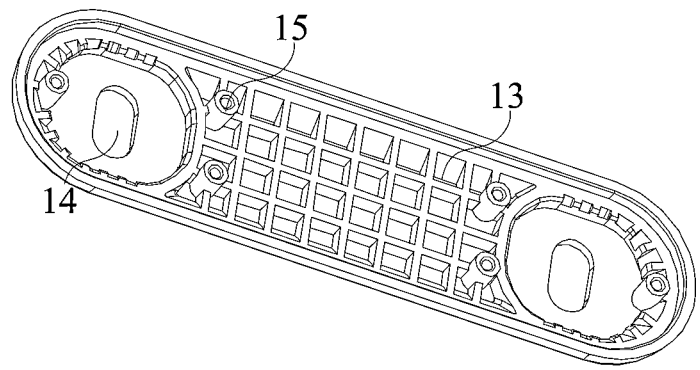
FIG. 3 is a schematic structural diagram of a main body portion of the lanyard device shown in FIG. 1 at a certain perspective.

Specifically, please refer to FIG. 3, which is a schematic structural diagram of a main body portion of the lanyard device shown in FIG. 1 at a certain perspective. The main body portion 10 is preferably made of a plastic material, the main body portion 10 comprises a top wall 11 and a side wall 12 surrounding the top wall 11, wherein the top wall 11 and the side wall 12 form an accommodating space 13 in an enclosure manner, and the top wall 11 is provided with a strip-shaped through hole 14. The main body portion 10 is preferably long strip-shaped.

Figure 4:
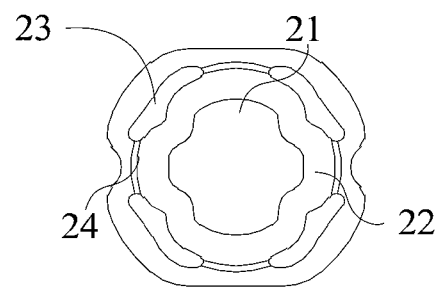
FIG. 4 is a schematic structural view of an elastic support of the lanyard device shown in FIG. 1.

Please refer to FIG. 4 together, which is a schematic structural view of an elastic support of the lanyard device shown in FIG. 1. The elastic support 20 is arranged in the accommodating space 13 by means of corresponding to the strip-shaped through hole 14, the elastic support is provided with a crossed strip-shaped hole which comprises a first clamping strip-shaped hole 21 and a second clamping strip-shaped hole 22 crossed with the first clamping strip-shaped hole 21, the first clamping strip-shaped hole 21 is in communication with the strip-shaped through hole 14. In this embodiment, the elastic support 20 is preferably a metal support, which has certain elasticity and good wear resistance. The first clamping strip-shaped hole 21 and the second clamping strip-shaped hole 22 preferably intersect in a regular cross; of course, in other embodiments, the first clamping strip-shaped hole 21 and the second clamping strip-shaped hole 22 may also intersect at other angles, and as long as the first clamping strip-shaped hole 21 and the second clamping strip-shaped hole 22 intersect with each other, they belong to the scope claimed under the idea of the present utility model and the purpose of the present utility model can be realized.

In order to provide avoidance in the rotation of the rotary pull head 40 and further improve the service life of the elastic support 20, the elastic support 20 is further provided with avoidance holes 23, and the avoidance holes 23 are arranged around the crossed strip-shaped hole. Preferably, the avoidance holes 23 are provided in four, and reinforcing ribs 24 are arranged between adjacent ones of the avoidance holes 23. The elastic support 20 with this structure can not only ensure the structural strength, but also ensure the service life.

The colloid 30 at least seals part of the accommodating space 13, and is used for adhering the lanyard device to the electronic apparatus, the lanyard device of the present application can be directly adhered to and connected with the back of the electronic apparatus itself or the back of the protective shell of the electronic apparatus through the colloid 30; as compared to the prior art in which the lanyard device are integrally formed with the protective shell of the electronic apparatus, the lanyard device of the present application can be used flexibly at will and at low cost. In this embodiment, the colloid 30 is preferably a removable glue with strong viscosity, and the specific type of the removable glue is not limited.

Figure 5:
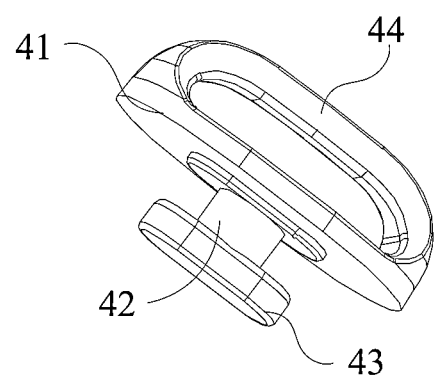
FIG. 5 is a schematic structural diagram of a rotary pull head of the lanyard device shown in FIG. 1.

Please refer to FIG. 5 together, which is a schematic structural diagram of a rotary pull head of the lanyard device shown in FIG. 1. The rotary pull head 40 comprises a pull head body 41, a pull head shaft 42 and a clamping block 43, one side of the pull head body 41 is connected to one end of the pull head shaft 42, a hook 44 is arranged on the side of the pull head body 41 away from the pull head shaft 42, and the other end of the pull head shaft 42 is connected to the clamping block 43; in order to reduce the friction between the clamping block 43 and the crossed strip-shaped hole during the rotation, the clamping block 43 is preferably in the form of a racetrack.

Preferably, the lanyard device further comprises a rigid member 50, and the rigid member 50 is arranged inside the colloid 30. The rigid member 50 can increase the overall strength of the lanyard device, improve the flatness and facilitate the adhesion of the colloid 30, and the rigid member 50 is welded by ultrasonic wave.

Preferably, a plurality of supporting columns 15 are further convexly arranged inside the main body portion 10, and through holes are arranged at positions of the rigid member 50 corresponding to the plurality of supporting columns 15. In this embodiment, the supporting columns 15 are welded by ultrasonic wave, and the accommodating space 13 of the main body portion 10 is fully filled by the arrangement of the multiple supporting columns 15, so that the structure is closely connected and the strength is great. Preferably, the supporting columns 15 are arranged around the elastic support 20, and because force will be exerted to the place where the elastic support 20 is located, the structural strength of the lanyard device can be greatly improved by the arrangement of the supporting columns 15.

Preferably, the lanyard device further comprises a gasket 70, and the gasket 70 is arranged between the top wall 11 and the rotary pull head 40. The gasket 70 is preferably a plastic sheet made of PC material, and the gasket 70 can make the rotary pull head 40 closely connected with the main body portion 10, and meanwhile prevent users from scratching or being scratched by the rotary pull head 40, and further provide a beautiful appearance.

Preferably, the lanyard is connected to the hook 44.

Preferably, the crossed strip-shaped hole, the strip-shaped through hole 14 and the rotary pull head 40 are respectively provided in two.

It shall be noted that, it will be regarded as within the scope claimed in the present application as long as the aforesaid structure in which the main body portion 10 cooperates with the rotary pull head 40 is adopted, and in order to be comfortable to wear, more than two sets of structures described above can be provided, namely, the crossed strip-shaped hole, the strip-shaped through hole 14 and the rotary pull head 40 are respectively provided in two (as shown in FIG. 1 to FIG. 3).

The structure of the lanyard device is introduced above, and the working process of the lanyard device will be explained hereinafter:

When the lanyard device is in a normal state, the clamping block 43 of the rotary pull head 40 is clamped into and matched with the second clamping strip-shaped hole 22, and the lanyard device can be worn on the human body through the lanyard; when the lanyard device needs to be disassembled, the rotary pull head 40 is rotated so that the clamping block 43 of the rotary pull head 40 corresponds to the first clamping strip-shaped hole 21 and the strip-shaped through hole 14, and the rotary pull head 40 can be disassembled from the main body portion 10; for convenience of disassembly, in this embodiment, the width of the first clamping strip-shaped hole 21 is further set to be larger than the width of the clamping block 43, and in this way, when the rotary pull head 40 rotates to a certain angle, the rotary pull head 40 can be easily detached.

Beneficial effects of the present application are as follows: unlike the situation in the prior art, the lanyard device provided by the present application is provided with an elastic support, and a crossed strip-shaped hole is arranged on the elastic support, so that the rotary pull head can be conveniently installed and taken out by rotating to disassemble the lanyard, and the lanyard device of the present application can be directly adhered to the back of an electronic apparatus or the back of a protective shell of the electronic apparatus through the colloid; and thus, the lanyard device of the present application is simple in terms of structure, convenient to a disassemble and convenient to store the lanyard, and is flexible to use in a matching manner.

What described above are only the embodiments of the present application, and are not intended to limit the patent scope of the present application; any equivalent structures or equivalent process modifications that are made according to the specification and the attached drawings of the present application, or any direct or indirect applications of the present application in other related technical fields shall all be covered within the scope claimed in the present application.

What is claimed is:

1. A lanyard device, comprising:
   a main body portion, comprising a top wall and a side wall surrounding the top wall, the top wall and the side wall forming an accommodating space in an enclosure manner, and the top wall being provided with a strip-shaped through hole;
   an elastic support, being arranged in the accommodating space and corresponding to the strip-shaped through hole, the elastic support being provided with a crossed strip-shaped hole which comprises a first clamping strip-shaped hole and a second clamping strip-shaped hole crossed with the first clamping strip-shaped hole, the first clamping strip-shaped hole being in communication with the strip-shaped through hole;
   a colloid, at least enclosing part of the accommodating space and being used for adhering the lanyard device to an electronic apparatus;
   a rotary pull head comprising a pull head body, a pull head shaft and a clamping block, one side of the pull head body being connected to one end of the pull head shaft, a hook being arranged on the side of the pull head body away from the pull head shaft, and the other end of the pull head shaft being connected to the clamping block;
   a lanyard, being connected to the hook;
   wherein when the lanyard device is in a normal state, the clamping block of the rotary pull head is clamped into and fastened with the second clamping strip-shaped hole, and when the lanyard device needs to be disassembled, the rotary pull head is rotated so that the clamping block of the rotary pull head corresponds to the first clamping strip-shaped hole and the strip-shaped through hole.

2. The lanyard device according to claim 1, wherein the lanyard device further comprises a rigid member, and the rigid member is arranged inside the colloid.

3. The lanyard device according to claim 2, wherein a plurality of supporting columns are further convexly arranged inside the main body portion, and through holes are arranged at positions of the rigid member corresponding to the plurality of supporting columns.

4. The lanyard device according to claim 3, wherein the supporting columns are welded by ultrasonic wave.

5. The lanyard device according to claim 1, wherein the elastic support is further provided with avoidance holes, and the avoidance holes are arranged around the crossed strip-shaped hole.

6. The lanyard device according to claim 5, wherein the avoidance holes are provided in four, and reinforcing ribs are arranged between adjacent ones of the avoidance holes.

7. The lanyard device according to claim 1, wherein the clamping block is in the form of a racetrack.

8. The lanyard device according to claim 1, wherein the first clamping strip-shaped hole and the second clamping strip-shaped hole intersect in a regular cross.

9. The lanyard device according to claim 1, wherein the lanyard device further comprises a gasket, and the gasket is arranged between the top wall and the rotary pull head.

10. The lanyard device according to claim 1, wherein there are provided two of each of the crossed strip-shaped hole, the strip-shaped through hole and the rotary pull head.

\* \* \* \* \*